United States Patent

Paganessi et al.

[11] Patent Number: 6,032,483
[45] Date of Patent: Mar. 7, 2000

[54] SYSTEM AND METHOD FOR DELIVERY OF A VAPOR PHASE PRODUCT TO A POINT OF USE

[75] Inventors: Joseph E. Paganessi, Burr Ridge, Ill.; Benjamin J. Jurcik, St Rémy les Chevreuse, France; Richard Udischas, Joliet; Hwa-Chi Wang, Naperville, both of Ill.

[73] Assignee: American Air Liquide Inc., Walnut Creek, Calif.

[21] Appl. No.: 09/055,970

[22] Filed: Apr. 7, 1998

[51] Int. Cl.[7] ............................................. F25J 1/00
[52] U.S. Cl. ................... 62/620; 62/630; 62/924
[58] Field of Search ................ 62/620, 630, 924

[56] References Cited

U.S. PATENT DOCUMENTS

| | | | |
|---|---|---|---|
| 3,574,276 | 4/1971 | Strelzoff | 62/50.5 |
| 3,805,536 | 4/1974 | Lynn | 62/924 |
| 4,180,123 | 12/1979 | Dixon | 62/50.5 |
| 5,100,447 | 3/1992 | Krishnamurthy et al. | 62/924 |
| 5,220,797 | 6/1993 | Krishnamurthy et al. | 62/924 |
| 5,252,134 | 10/1993 | Stauffer | 118/726 |
| 5,359,787 | 11/1994 | Mostowy, Jr. et al. | 34/343 |
| 5,399,200 | 3/1995 | Stauffer | 118/726 |
| 5,505,782 | 4/1996 | Stauffer | 118/726 |
| 5,595,603 | 1/1997 | Klinedinst et al. | 118/715 |

*Primary Examiner*—Ronald Capossela
*Attorney, Agent, or Firm*—Burns, Doane, Swecker, and Mathis, L.L.P.

[57] ABSTRACT

Provided are a novel system and method for delivery of a vapor phase product to a point of use, as well as a novel on-site chemical distribution system and method. The system for delivery of a vapor phase product includes a storage vessel containing a liquid chemical under its own vapor pressure, a column connected to receive the chemical in liquified state from the storage vessel, wherein the chemical is fractionated into a contaminated liquid heavy fraction and a purified light vapor fraction and a conduit connected to the column for removing the purified light vapor fraction therefrom. The system is connected to the point of use for introducing the purified vapor fraction thereto. Particular applicability is found in semiconductor manufacturing in the delivery of electronics specialty gases to one or more semiconductor processing tools.

58 Claims, 3 Drawing Sheets

SYSTEM AND METHOD FOR DELIVERY OF A VAPOR PHASE PRODUCT TO A POINT OF USE

BACKGROUND OF THE INVENTION

1. Field of the Invention

The present invention relates to a system and a method for delivery of a vapor phase product to a point of use. The present invention also relates to an on-site chemical distribution system and to a method for on-site distribution of a chemical. The invention has particular applicability in the delivery of electronics specialty gases used in the manufacture of semiconductor devices to one or more semiconductor processing tools.

2. Description of the Related Art

In the semiconductor manufacturing industry, different chemicals are supplied to processing tools in gaseous form for carrying out a variety of semiconductor fabrication processes. Examples of such processes include diffusion, chemical vapor deposition (CVD), etching, sputtering and ion implantation. These chemicals are conventionally referred to as electronics specialty gases (ESG's).

Many of the chemicals employed in the above processes, while introduced to the processing tools in the gaseous state, are stored as liquids under their own respective vapor pressures. Typically, the liquid chemicals have room temperature vapor pressures greater than atmospheric pressure.

These chemicals are conventionally stored in gas cylinders which are housed within gas cabinets. A typical volume of such a gas cylinder is less than about 50 liters. A partial list of chemicals stored in this manner, the pressures under which they are stored and their critical pressures are provided below in Table 1:

TABLE 1

| Chemical | Formula | Vapor Pressure of Gas at 20° C. (psia) | Critical Pressure (psia) |
| --- | --- | --- | --- |
| Ammonia | $NH_3$ | 129 | 1636 |
| Boron Trichloride | $BCl_3$ | 19 | 1071 |
| Carbon Dioxide | $CO_2$ | 845 | 1118 |
| Chlorine | $Cl_2$ | 100 | 634.7 |
| Chlorotrifluoride | $ClF_3$ | 26.1 | 837.4 |
| Dichlorosilane | $SiH_2Cl_2$ | 24 | 746.6 |
| Disilane | $Si_2H_6$ | 48 | 956.9 |
| Hydrogen Bromide | HBr | 335 | 1240 |
| Hydrogen Chloride | HCl | 628 | 1198 |
| Hydrogen Fluoride | HF | 16 | 940.2 |
| Nitrous Oxide | $N_2O$ | 760 | 1050 |
| Perfluoropropane | $C_3F_8$ | 115 | 388.5 |
| Sulfur Hexafluoride | $SF_6$ | 335 | 545.0 |
| Tungsten Hexafluoride | $WF_6$ | 16 | 619.1 |

A single gas cabinet typically supplies the chemical vapor to a single or at most several semiconductor processing tools. Operation of the gas cabinets and the cylinders housed therein can be a hazardous, labor intensive and costly activity. As the chemical is depleted, it is imperative that the gas cylinder be replaced with careful and proper handling procedures.

In order to reduce the total number of gas cabinets required in the semiconductor manufacturing facility, it has recently been proposed that a single gas cabinet service multiple processing tools. Since the volumes of the cylinders housed in the gas cabinets does not increase with the number of processing tools being serviced, replacement frequency of the cylinders in the cabinets necessarily increases. It is, however, desirable to minimize the frequency of cylinder replacement, not only for safety concerns but also to reduce the risk of introducing impurities that may cause significant product loss.

In addition to increasing the frequency of gas cylinder replacement, the instantaneous flowrate of the gas being withdrawn from each cylinder increases with the additional processing tools serviced by a given gas cabinet. Such an increase in flowrate can lead to the presence of entrained liquid droplets in the gas stream, which can result in flowrate fluctuations, accelerated corrosion and premature failure of flow control components in the gas distribution system. Furthermore, the corrosion products can lead to contamination of the highly pure process gases. This contamination can have deleterious effects on the processes being run, and ultimately on the manufactured semiconductor devices.

To meet the requirements of the semiconductor processing industry and to overcome the disadvantages of the related art, it is an object of the present invention to provide novel systems for delivery of a chemical stored as a liquid under its own vapor pressure. The systems make possible the simultaneous servicing of multiple processing tools and additionally can perform a purification function, whereby highly pure gases useful in semiconductor manufacture can be produced. Because of such purification function, the systems make possible the use of a relatively low purity starting material, which material would otherwise not be useful, for example, in semiconductor manufacturing.

According to one aspect of the invention, entrained liquid droplets in the gas obtained from the liquid chemical can be minimized or eliminated. As a result, single phase process gas flow can be obtained, in contrast to known systems and methods.

It is a further object of the present invention to provide novel methods for delivery of a chemical stored as a liquid under its own vapor pressure, which methods can be practiced on the inventive systems.

It is a further object of the present invention to provide a novel on-site chemical distribution system, and a method for on-site chemical distribution which method can be practiced on the system.

Other objects and aspects of the present invention will become apparent to one of ordinary skill in the art upon review of the specification, drawings and claims appended hereto.

SUMMARY OF THE INVENTION

The foregoing objectives are met by the systems and methods of the present invention. According to a first aspect of the present invention, a novel system for delivery of a vapor phase product to a point of use is provided. A storage vessel contains a liquid chemical under its own vapor pressure. A column is connected to receive the chemical in liquified state from the storage vessel, wherein the chemical is fractionated into a contaminated liquid heavy fraction and a purified light vapor fraction. A conduit is connected to the column for removing the purified light vapor fraction therefrom, wherein the system is connected to the point of use for introducing the purified vapor fraction thereto.

According to a second aspect of the invention, a system for delivery of a vapor phase product is provided which involves a plurality of columns. The system comprises a storage vessel containing a liquid chemical under its own vapor pressure, and a plurality of columns. Each column fractionates a liquid introduced therein into a respective heavy liquid fraction and a respective light vapor fraction. A first column of the plurality of columns is connected to receive, as the liquid introduced therein, the chemical in liquified state from the storage vessel. A conduit is connected to a second column of the plurality of columns for removing therefrom the respective light vapor fraction. The system is connected to the point of use for introducing the second column light vapor fraction thereto.

A method for delivery of a vapor phase product to a point of use is also provided. According to the method, a storage vessel containing a liquid chemical under its own vapor pressure is provided. A stream of the chemical is introduced in liquified state into a column, whereby the chemical is fractionated into a contaminated liquid heavy fraction and a purified light vapor fraction. The purified light vapor fraction is introduced to the point of use.

According to a further aspect of the invention, a method for delivery of a vapor phase product to a point of use is provided. A storage vessel containing a liquid chemical under its own vapor pressure is provided. A plurality of columns are provided. Each column fractionates a liquid introduced therein into a respective heavy liquid fraction and a respective light vapor fraction. A first column of the plurality of columns is connected to receive, as the liquid introduced therein, the chemical in liquified state from the storage vessel. The respective light vapor fraction is removed from a second column of the plurality of columns, and the second column light vapor fraction is introduced to the point of use.

According to a further aspect of the invention, an on-site chemical distribution system is provided. The system comprises a storage vessel containing a liquid chemical under its own vapor pressure and a plurality of vapor supply systems. The vapor supply systems are connected in parallel and downstream from the storage vessel, and are connected to receive the chemical in liquified state. Each of the vapor supply systems produces a respective purified vapor product, and is connected to one or more respective points of use for introducing the respective purified vapor product thereto.

In accordance with yet another aspect of the invention, a method for on-site distribution of a chemical is provided, which method can be practiced on the above-described system. The method comprises providing a storage vessel containing a liquid chemical under its own vapor pressure, and introducing the chemical in liquified form to a plurality of vapor supply systems. The vapor supply systems are connected in parallel and downstream from the storage vessel. Each of the vapor supply systems produces a respective purified vapor product. The respective purified vapor products are introduced to one or more respective points of use.

The systems and methods have particular applicability in the delivery of an electronics specialty gas to one or more points of use in a semiconductor manufacturing facility, for example to one or more semiconductor processing tools.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

The present invention provides an effective way to provide a high purity chemical which is stored as a liquid under its own vapor pressure to one or more points of use, for example, processing tools used in the fabrication of semiconductor devices.

As used herein, the term "a liquid chemical under its own vapor pressure" means a chemical, which at ambient conditions would be in the gas phase, has had its temperature and/or pressure modified such that it is in its liquid state at or near (i.e., within about +5° C. of) its boiling point.

Figure 1:
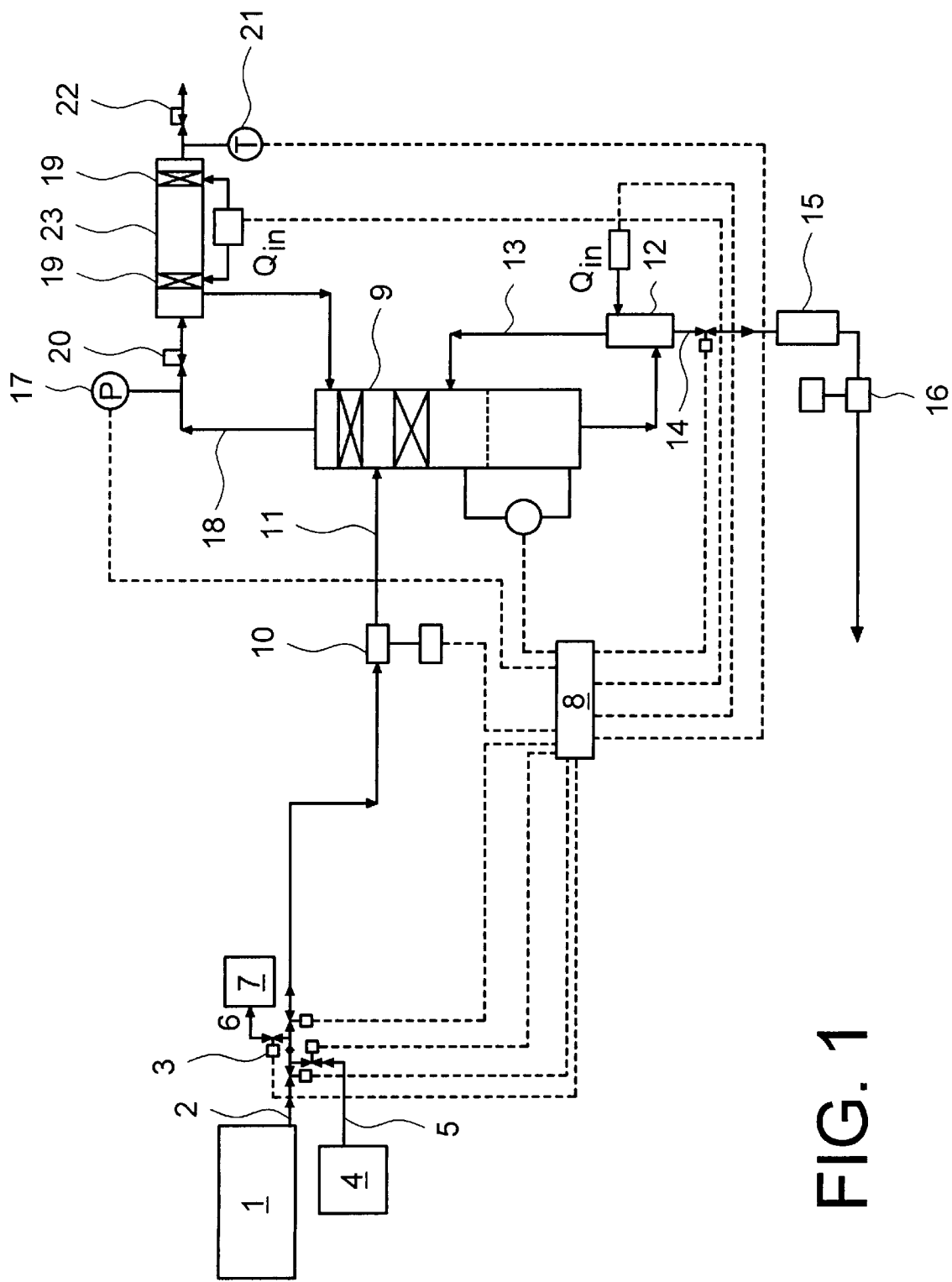
FIG. 1 is a schematic diagram of a system for delivery of a vapor phase product in accordance with one aspect of the invention.

With reference to FIG. 1, a preferred embodiment of the inventive system and method will be described.

The system includes a storage vessel 1 which contains a chemical stored as a liquid under its own vapor pressure. The liquid chemical can be generated on-site and stored in a bulk storage vessel or, more typically, the liquid chemical is delivered to the use site via bulk transport vessel, for example, a tube trailer. Storage vessel 1 preferably has an internal volume of greater than about 100 liters, preferably from about 200 to 60,000 liters. Sizing of the components and the flowrates involved are not to be limited, but depend on the specific application involved.

The specific liquid chemical contained in storage vessel 1 is dependent on, for example, on the processing tools being serviced and the processes being run therein. In semiconductor manufacturing processes, typical liquid chemicals include those electronics specialty gases (ESG's) specified in Table 1 above, i.e., ammonia ($NH_3$), boron trichloride ($BCl_3$), carbon dioxide ($CO_2$), chlorine ($Cl_2$), chlorotrifluoride ($ClF_3$) dichlorosilane ($SiH_2Cl_2$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), trichlorosilane ($SiHCl_3$, and tungsten hexafluoride ($WF_6$). Additional ESG's include, for example, the class of materials known as perfluorocarbons (PFC's).

For electronics manufacturing applications, it is desirable that storage vessel 1 be compatible with the liquid chemical contained therein and with the high purities required in the manufacturing process. The storage vessel is preferably constructed of stainless steel and can be surface treated, for example, by mechanical polishing or electropolishing and passivation.

The liquid chemical contained in the storage vessel is preferably of high purity. However, because of the purification function of the system and method, the liquid chemical purity can be relatively low compared with conventional practice.

Storage vessel 1 is connected to a conduit 2 for transferring the chemical in liquified form from the storage vessel to other components of the system. Suitable materials of construction for liquid transferring conduit 2 and other conduits which contact the chemical in liquified form generally include but are not limited to, 316 stainless steel. The specific material selected, however, will depend upon the specific liquid chemical being used.

Flowrates throughout the system will depend on the specific applications involved, and the system is preferably designed around the flowrate requirements.

A high purity block, bleed and purge system 3 can be disposed downstream of the point of connection of storage vessel 1 to conduit 2. The purpose of the block, bleed and purge system 3 is to ensure that contaminants are not introduced into the system during replacement of storage vessel 1.

In the exemplified embodiment, block, bleed and purge system 3 includes a high purity inert purge gas source 4, such as nitrogen, argon or helium, for the removal of ambient contaminants and for the removal of residual chemicals in the system during replacement of storage vessel 1. Preferably, a nitrogen-driven venturi purge system is employed for this purpose. A purge gas line 5 is connected to conduit 2 downstream of the point of connection of storage vessel 1. The purge gas is typically bled off through a bleed line 6, which can be connected to a waste treatment unit 7 for further processing.

Depending upon the specific chemical employed, waste treatment unit 7 can comprise, for example, a unit for adsorption, scrubbing, thermal decomposition, storage or a combination thereof. To reduce the quantity of liquid chemical and/or contaminated purge gas that is sent to waste treatment unit 7, it is desirable to minimize the volume of block, bleed and purge system 3.

Control of the gas flow in block, bleed and purge system 3 can be accomplished by manipulation of valves V1 and V2 in conduit 2, valve V3 in purge gas line 5 and valve V4 in bleed line 6. The system can be further integrated with a cycling valve, so that removal of ambient contaminants or residual chemical can be accomplished through a series of pressure-vacuum cycles.

Flow control throughout the system, including operation of block, bleed and purge system 3, can be automated with a controller 8. Suitable control means are known in the art, and include, for example, one or more programmable logic controllers (PLCs) or microprocessors.

After connection of storage vessel 1 to the system and purging, the liquid chemical can be transported through the system from the storage vessel, in liquified form, into a column 9, which is in fluid communication with the storage vessel. The liquid chemical is introduced into the column at an intermediate point thereof.

Flow of the chemical into the column can be aided by use of a pump 10, such as a positive displacement pump. The inlet of the pump is preferably connected as closely as possible to the purge block to minimize pressure losses on the suction side. The outlet of pump 10 is connected to a conduit 11 through which the liquid chemical is transported to column 9. Depending on the nature of the impurities to be removed and the degree of purification desired, it may be desirable to employ a plurality of columns where multiple. Where multiple columns are used, they may be disposed in series or in parallel. Multiple column systems are further described below in reference to FIG. 2.

Various types of columns are envisioned for use with the invention. The column should allow intimate contact between liquid and vapor phases, whereby a purified vapor can be obtained therefrom. Suitable columns include, for example, distillation, absorption and adsorption columns, and chemical conversion/reaction units of the trace impurity or impurities. Where multiple columns are employed, the columns can be of the same or a different type.

The column typically contains one or more liquid-vapor phase contact promoting devices, such as structured, ordered and random packing materials, or sieve, bubble-cap, valve, Kittel plate, flexitray, shower trays and other special tray designs, to provide for a high degree of contact between the liquid and vapor phases in the column. Of these liquid-vapor phase contact promoting devices, randomly packed column and bubble-cap are preferred.

Suitable packing materials are known in the art, and include, for example, Rachig rings, Lessing Rings, Berl saddles, spiral partition rings and grid packing. Suitable materials of construction for the packing materials include, for example, glass, quartz, ceramics and stainless steel. Choice of the packing type and material of construction is dependent on factors, such as the chemical being purified and its mass flow rate.

Where an adsorbent is to be employed in the column, the adsorbent will depend on the particular chemical being treated, as well as the impurity or impurities to be removed. Typical adsorbents include, for example, ascerite for $CO_2$ removal from $N_2O$, metal impregnated carbons for sulfur compound removal from $CO_2$, activated carbons for removal of volatile hydrocarbons, and molecular sieves, alumina and silica based products.

Where trays are employed in the purification column, the trays are typically constructed of stainless steel. The total number of trays will depend on the specific chemical being treated and the nature and concentration of impurities therein, as well as the degree of purification desired.

Liquid feed to column 9 can be controlled by use of a controller 8. The controller description set forth above applies also to the liquid feed controller, and to each of the controllers to be described below. Thus, while FIG. 1 illustrates a single controller for controlling various aspects of the system, the use of multiple controllers is also envisioned.

The controller can operate, for example, based on input from a level sensor/transmitter 24 which monitors the liquid chemical level at the bottom of column 9. The controller can turn on and off pump 10 as required to maintain the liquid chemical level at the bottom of the column at a desired, predetermined level.

While the pressure and temperature maintained in the column will vary depending on the specific liquid chemical being treated and the nature of the impurities therein, column 9 preferably operates at a pressure of from about 1 to 100 bar, more preferably from about 5 to 20 bar, and at a temperature of from about $-200$ to $300°$ C., more preferably from about $-40$ to $150°$ C.

The liquid chemical introduced into the column is fractionated into a contaminated liquid heavy fraction, and a light vapor fraction. As used herein, the term "heavy fraction" refers to a stream removed from a portion of a column below the liquid feed stage. The heavy product is in a liquid state, and is preferably removed from the bottom of the column.

Also as used herein, the term "light vapor fraction" refers to a stream removed from a portion of a column above a feed stage. The light vapor product is preferably removed from the top of the column.

At least a portion of the contaminated liquid heavy fraction is converted into a saturated vapor in reboiler/vaporizer 12. The saturated vapor is returned to column 9 through a conduit 13, connected to the column at a point below conduit 11. In this way, the saturated vapor and the liquid chemical introduced into column 9 can contact each other intimately in a countercurrent manner. A high purity vapor thereby can be produced. Conduit 18 is connected to the column at a point above conduit 11, preferably at the top of the column, for removing the high purity vapor therefrom. The high purity vapor stream has a purity compatible with semiconductor manufacturing processing, preferably in the ppm or sub-ppm range.

The heat duty $Q_{in}$ for vaporizer 12 can be provided by a heat source, such as an electric heater for direct heat input or a heating medium stream, for example, water, glycol solution, halocarbon fluids, or other heat transfer fluids which are known to those skilled in the art.

Residual contaminated liquid in the vaporizer can be periodically drained therefrom through vaporizer purge line 14. Such purging can help to minimize the concentration of the heavier, i.e., high boiling, components in the saturated vapor. The removed contaminated liquid can be introduced into a holding vessel 15, which can be periodically drained using pump 16. This waste material can be sent to a waste treatment unit and/or can be pumped into a container for shipment back to the chemical supplier for purification and reuse.

Various aspects of the operation of vaporizer 12, such as the heat duty $Q_{in}$ required to vaporize a major portion of the liquid feed can be controlled by a controller 8 based on the total system pressure. The total system pressure can be measured by any known means, such as pressure sensor 17 in conduit 18. The controller can additionally be used to control purging of the contaminated liquid from the vaporizer on a predetermined schedule.

In order to remove or minimize any entrained liquid droplets present in the high purity vapor withdrawn from the column through conduit 18 and to prevent the formation of such droplets due to condensation, the high purity vapor can be superheated. Such superheating can ensure single phase gas flow. This superheating can be achieved by use of one or more superheaters 19, with the pressure of the high purity vapor upstream of the superheater being controlled by a pressure regulator 20.

The superheater can be any unit which effectively removes the entrained liquid droplets from the gas stream. For example, a heat exchanger (e.g., a shell-and-tube type heat exchanger) using a suitable heat transfer fluid, for example, halocarbons such as freons (e.g., freon 22), can be used for this purpose. Other examples of suitable structures for superheating the gas include a resistance-type heater, heater grid-type packing material, heated sintered or porous structures, and any other direct or indirect methods of heating.

The temperature of the vapor passing through the superheater is monitored at its outlet by temperature monitor 21. To prevent the formation of condensate caused by expansion and cooling of the gas as it passes through pressure regulator 22 and the subsequent gas distribution piping, the heat duty $Q_{in}$ supplied to the high purity vapor can be regulated by controller 8.

An additional feature of the invention is a surge tank 23. Surge tank 23 acts as a reservoir for the high purity vapor, and minimizes pressure fluctuations in the gas delivered to the point(s) of use. As shown in the exemplified embodiment, the superheater and surge tank are preferably provided in combination as a single unit. The superheater can alternatively be disposed in series with the surge tank.

The pressure in the surge tank, or combination surge tank/superheater, is preferably maintained at only several psi, for example, from 1 to 30 psi, above the normal distribution piping system pressure, but significantly lower, for example, from 20 to 50 psi, than the purification column pressure.

To allow servicing of the one or more points of use, gas distribution piping is connected thereto. Thus, in the case of semiconductor manufacturing, one or more semiconductor processing tools can be connected to receive the high purity vapor.

Figure 2:
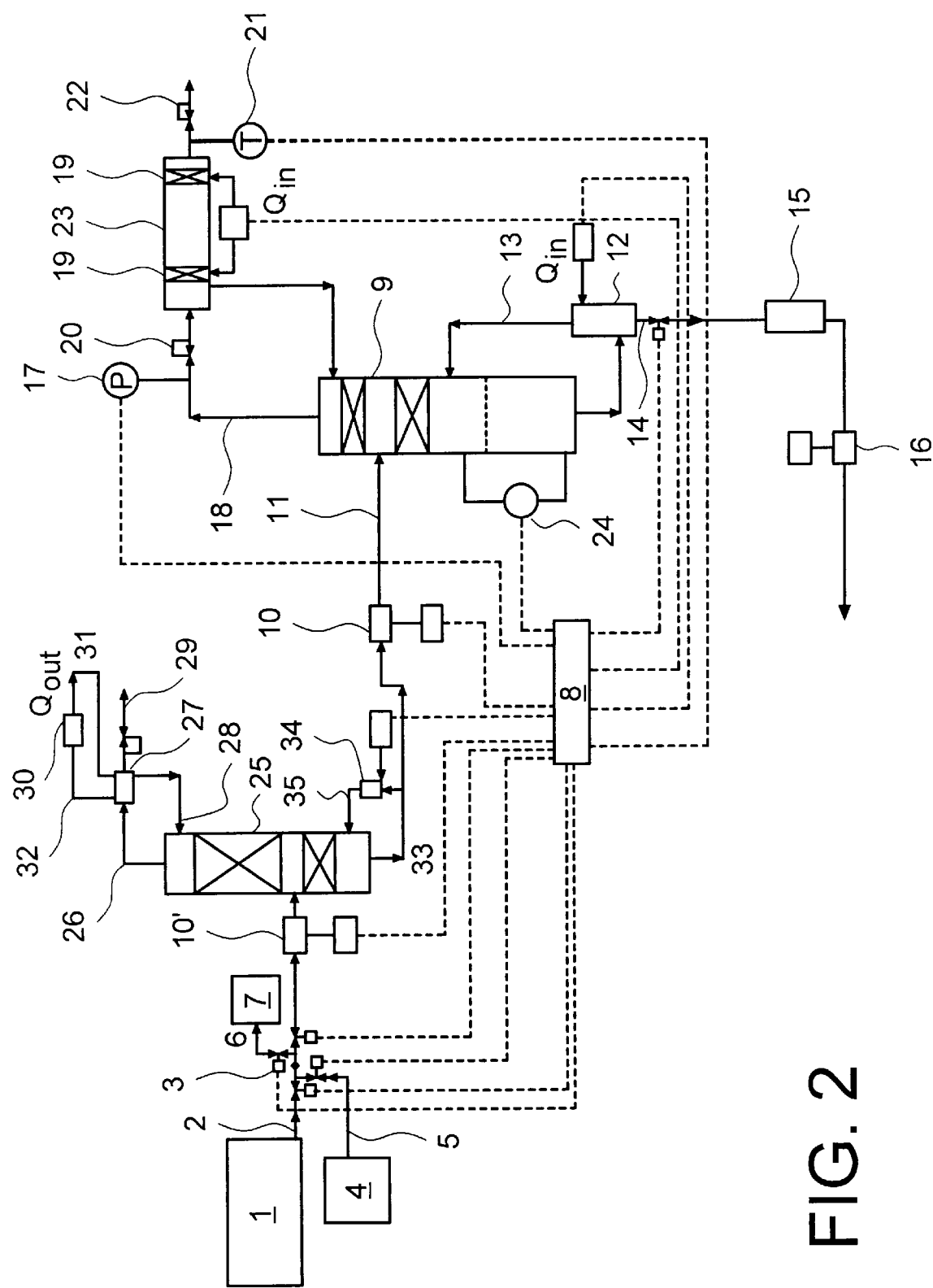
FIG. 2 is a schematic diagram of a system for delivery of a vapor phase product in accordance with a further aspect of the invention.

FIG. 2 illustrates a further aspect of the present invention, wherein a plurality of columns are employed. By employing a plurality of columns, higher levels of purity for the gas phase product may be obtained than for the single column system and method, especially if both light and heavy impurities exist in the feed chemical. The description set forth above with respect to FIG. 1 is applicable to the plural column system, with various differences being outlined below.

First column 25 is disposed between pump 10 and second column 9, which corresponds to the column described in reference to FIG. 1. The chemical contained in storage vessel 1 is introduced into first column 25 in liquified form at a feed stage at an intermediate point in the column. The types of columns described above with reference to FIG. 1 are applicable to column 25.

The liquid feed into first column 25 is fractionated into a liquid heavy fraction and a light vapor fraction. The light vapor fraction is removed from first column 25 through conduit 26 disposed above the feed stage, preferably at the top of the column. The light vapor fraction is introduced into condenser 27, and is at least partially condensed therein.

A portion of the condensate is reintroduced into column 25 through conduit 28 as reflux, which is connected to the column at a point above the feed stage. The remainder of the light vapor fraction is removed from the system through conduit 29. The waste vapor can optionally be further processed, for example, by a waste treatment facility.

The cooling duty $Q_{out}$ for condenser 27 of first column 25 is provided by a refrigeration cycle which includes refrigeration unit 30 and a cooling medium transported to and from the condenser through lines 31 and 32, respectively. The operational pressure and temperature of first column 25 are such that conventional refrigerants can be used as the cooling medium. Suitable refrigerants are known to those skilled in the art, and include, for example, freons such as from 11, 12, 21, 22, 113, 114, 115, 134b, 142b, 152a and 216.

The cooling duty for the condenser can be provided by an open refrigeration cycle, which may use a different cooling medium, such as liquified or gaseous $N_2$, $O_2$ or Ar, liquid $CO_2$ or water.

The liquid heavy fraction is removed from first column 25 through conduit 33. At least a portion of the removed liquid heavy fraction is introduced into a reboiler 34. At least a portion thereof is vaporized and reintroduced in vapor form into first column 25 at a point below the feed stage through conduit 35. The heat duty $Q_{in}$ for reboiler 34 can be provided by a heat source, such as an electric heater for direct heat input or a heating medium stream, for example, water, a glycol solution or a halocarbon fluid. Other suitable heat transfer fluids are known to those skilled in the art.

That portion of the liquid heavy fraction which is not introduced into the reboiler is introduced into second column 9 in liquified form using pump 10 (described above). As another option, if the operational pressure difference between first column 25 and second column 9 is sufficient to allow flow, pump 10 may be replaced by a control valve for flow control. The remaining components of the system and method steps are as described above with reference to FIG. 1.

Operation of the condenser and/or the reboiler can be controlled by use of a single or multiple controllers, such as described above. As shown in the exemplified embodiment, controller 8 controls the heat duty to reboiler 34.

For the exemplary two-column system, first column 25 preferably operates at a pressure in the range of from about 1 to 100 bar, more preferably from about 5 to 20 bar, and at a temperature in the range of from about −200 to 300° C., more preferably from about −40 to 150° C.

The second column 9 preferably operates at a pressure in the range of from about 1 to 100 bar, more preferably from about 5 to 20 bar, and at a temperature in the range of from about −200 to 300° C., and more preferably from about −40 to 150° C. These conditions are, of course, dependent on the specific gas being treated and the nature of the impurities contained therein.

The use of multiple columns is not limited in any way by the illustrated preferred embodiment. In this regard, more than two columns can be employed in the present invention, and the columns can be linked in a variety of ways depending, for example, on the chemical being treated and the nature of impurities. Furthermore, the multiple columns can be disposed in series and/or in parallel.

Figure 3:
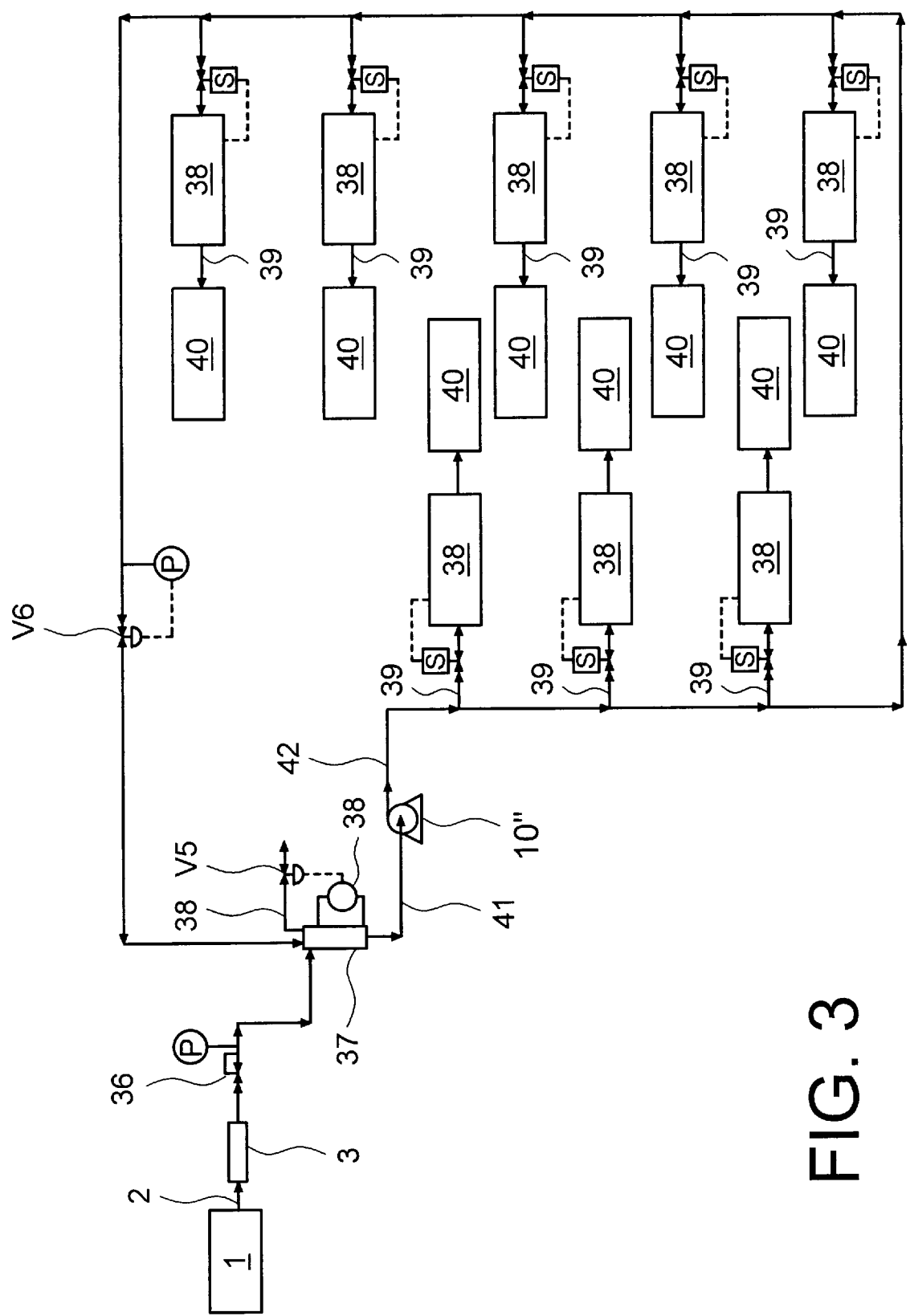
FIG. 3 is a schematic diagram of on-site chemical distribution system in accordance with a further aspect of the invention.

A variation of the above-described system and method as applied to a system and a method for on-site chemical distribution will now be described with reference to FIG. 3.

As in the above-described systems and methods, the on-site distribution system and method begin with a storage vessel 1 which contains the chemical stored as a liquid under its own vapor pressure. The storage vessel is connected to a conduit 2 for transferring the chemical in liquified form from the storage vessel to the other components of the system. A high purity block, bleed and purge system 3 can be disposed downstream of the point of connection of storage vessel 1 to conduit 2 to prevent contamination of the system.

The pressure of the liquid chemical in conduit 2 can be measured and regulated by pressure sensor P and regulator 36, respectively, the control of which can be automated by use of a controller. In the exemplary embodiment, the liquid chemical is introduced into a liquid reservoir 37, from which it is drawn and delivered to the remainder of the system. The internal volume of the liquid reservoir will depend on factors such as the liquid chemical flow requirements of the system. Suitable materials of construction for the liquid reservoir are the same as those set forth with respect to storage vessel 1.

It is desirable to eliminate or at least to minimize the formation of gas in the liquid reservoir. Such gas typically forms as a result of the pressure drop which occurs whenever the chemical is drawn off from the liquid reservoir. The elimination of this gas is particularly desirable prior to introduction of the liquid into a pumping system to prevent cavitation.

To minimize gas formation, it is desirable to control the level of the liquid chemical in the reservoir to a value greater than some predetermined minimum value. This control can be accomplished, for example, by detecting the liquid level in the reservoir with a level sensor connected to a controller 38. Based on the measured level, additional liquid chemical can be introduced into the reservoir from storage vessel 1 as needed. In addition, an exhaust conduit 38 can be provided for removing the gas from the liquid reservoir by operation of control valve V5. The gas removed through exhaust conduit 38 can be further treated, for example, by a waste treatment facility. The above described operations can be automated by use of, for example, controller 38 alone, or with one or more additional controllers.

From liquid reservoir 37, the liquid chemical is distributed throughout the remainder of the system by use of one or more pumps 10", such as a positive displacement pump. For example, a single pump 10" downstream from the storage vessel can be used to transport the liquid chemical to each of the vapor supply systems 38, as illustrated. As another possibility, each vapor supply system can have one or more dedicated pumps for transport of the liquid chemical thereto.

The liquid chemical is introduced from pump 10" into main conduit 42, and then via conduits 39 to a plurality of vapor supply systems 38, disposed in parallel with one another. To control flow to each of the vapor supply systems, a respective shut-off valve S and a controller therefor can be provided. The vapor supply systems each produce a purified vapor stream which is directed to one or more points of use 40. In the exemplified embodiment, the vapor supply systems supply an electronics specialty gas to one or more semiconductor processing tools.

The details of the vapor supply systems are provided above with reference to FIGS. 1 and 2. In this regard, the vapor supply systems include those components disposed downstream of the pump 10 in FIG. 1 and 10' in FIG. 2, leading up to the point of use.

According to a preferred aspect of the invention, an excess of the liquid chemical is introduced into conduit 41, such that the liquid feed to the vapor supply systems does not run out. Main conduit 42 preferably includes a recycle leg to return back to liquid reservoir 39 that portion of the liquid chemical which is not introduced into the vapor supply systems.

To control back-pressure in conduit, a pressure monitor P and control valve V6 are preferably provided in the recycle leg of the conduit. The control valve can be operated with a controller based on the pressure value measured by the pressure monitor. By controlling back-pressure, supply of the requisite amount of liquid chemical to the vapor supply systems can be ensured.

Because of the difference in density between the liquid and gas phase chemical, it is possible to use piping for transporting the liquid chemical which is of significantly smaller diameter than that used for transportation of the chemical in its gaseous state. Thus, less space is required for the liquid chemical distribution piping than if the chemical were transported entirely in the gas phase. Such liquid phase transport also helps to reduce pressure fluctuations when compared with gas phase distribution.

As a result of each of the systems and methods described above, characteristics of the gas being delivered can be maintained through wide fluctuations in flow rate. Such variations can result from the system's feeding numerous points of use which have flow rate requirements independent of each other. Fluctuations in the instantaneous flow rate requirement of greater than about one thousand times the average flow rate may be present without adversely affecting the performance of the systems and methods.

Furthermore, the performance characteristics of the systems and methods described above can be maintained throughout the campaign of the chemical storage vessel irrespective of the amount of liquid present therein. It is preferred, however, that the storage vessel be replaced when the chemical volume amounting to about 1 to 20% of the total volume of the vessel (depending on the specific chemical) remains.

Additionally, a wide array of use patterns is possible with the present invention. For example, the invention is compatible with continuous and intermittent operations. This allows flexibility in process design and can maximize the overall effectiveness of the equipment.

While the invention has been described in detail with reference to specific embodiments thereof, it will be apparent to those skilled in the art that various changes and modifications can be made, and equivalents employed, without departing from the scope of the appended claims.

What is claimed is:

1. A system for delivery of a vapor phase product to a point of use, the system comprising:
   a storage vessel containing a liquid chemical under its own vapor pressure;
   a column connected to receive the chemical in liquified state from the storage vessel, wherein the chemical is fractionated into a contaminated liquid heavy fraction and a purified light vapor fraction; and
   a conduit connected to the column for removing the purified light vapor fraction therefrom;
   wherein the system is connected to the point of use for introducing the purified vapor fraction thereto.

2. The system according to claim 1, wherein the storage vessel is a bulk transport vessel.

3. The system according to claim 1, further comprising a block, bleed and purge system disposed between the storage vessel and the column.

4. The system according to claim 1, wherein the column contains an adsorbent, a packing material, trays or a combination thereof.

5. The system according to claim 1, further comprising a vaporizer connected to receive at least a portion of the contaminated liquid heavy fraction from the column, the vaporizer comprising a purge line for draining the contaminated liquid heavy fraction therefrom.

6. The system according to claim 5, further comprising a waste treatment unit connected to receive the contaminated liquid heavy fraction drained through the vaporizer purge line.

7. The system according to claim 1, further comprising a superheater for superheating the purified light vapor fraction.

8. The system according to claim 7, further comprising a surge tank for containing the purified light vapor fraction, wherein the superheater and the surge tank form an integral unit or separate units.

9. The system according to claim 8, wherein the superheater and the surge tank form an integral unit.

10. The system according to claim 1, wherein the electronics specialty gas is selected from the group consisting of ammonia ($NH_3$), boron trichloride ($BCl_3$), carbon dioxide ($CO_2$), chlorine ($Cl_2$), chlorine trifluoride ($ClF_3$), dichlorosilane ($SiH_2Cl_2$), trichlorosilane ($SiHCl_3$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), tungsten hexafluoride ($WF_6$) and a perfluorocarbon.

11. The system according to claim 1, wherein the point of use comprises a semiconductor processing tool.

12. The system according to claim 1, wherein the system is connected to a plurality of points of use.

13. A system for delivery of a vapor phase product to a point of use, the system comprising:
   a storage vessel containing a liquid chemical under its own vapor pressure; and
   a plurality of columns, each column fractionating a liquid introduced therein into a respective heavy liquid fraction and a respective light vapor fraction;
   a first column of the plurality of columns being connected to receive, as the liquid introduced therein, the chemical in liquified state from the storage vessel; and
   a conduit connected to a second column of the plurality of columns for removing therefrom the respective light vapor fraction;
   wherein the system is connected to the point of use for introducing the second column light vapor fraction thereto.

14. The system according to claim 13, wherein the plurality of columns further comprises, in series and between the first and second columns, one or more additional columns, the additional columns being connected to receive a respective light vapor fraction from a respective preceding column.

15. The system according to claim 14, wherein the second column is connected to receive the respective heavy liquid fraction from the preceding column.

16. The system according to claim 13, wherein the storage vessel is a bulk transport vessel.

17. The system according to claim 13, wherein the column contains an adsorbent, a packing material, trays or a combination thereof.

18. The system according to claim 13, further comprising a superheater for superheating the second column light vapor fraction.

19. The system according to claim 18, further comprising a surge tank for containing the second column light vapor fraction, wherein the superheater and the surge tank form an integral unit or separate units.

20. The system according to claim 19, wherein the superheater and the surge tank form an integral unit.

21. The system according to claim 13, wherein the electronics specialty gas is selected from the group consisting of ammonia ($NH_3$), boron trichloride ($BCl_3$), carbon dioxide ($CO_2$), chlorine ($Cl_2$), chlorine trifluoride ($ClF_3$), dichlorosilane ($SiH_2Cl_2$), trichlorosilane ($SiHCl_3$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), tungsten hexafluoride ($WF_6$) and a perfluorocarbon.

22. The system according to claim 13, wherein the point of use comprises a semiconductor processing tool.

23. The system according to claim 13, wherein the system is connected to a plurality of points of use.

24. A method for delivery of a vapor phase product to a point of use, the method comprising:
   providing a storage vessel containing a liquid chemical under its own vapor pressure;
   introducing a stream of the chemical in liquified state into a column, whereby the chemical is fractionated into a contaminated liquid heavy fraction and a purified light vapor fraction; and
   introducing the purified light vapor fraction to the point of use.

25. The method according to claim 24, wherein the storage vessel is a bulk transport vessel.

26. The method according to claim 24, further comprising a step of superheating the purified light vapor fraction prior to the introducing to the point of use.

27. The method according to claim 26, further comprising containing the purified light vapor fraction in a surge tank prior to the introducing to the point of use.

28. The method according to claim 27, wherein the electronics specialty gas is selected from the group consisting of ammonia ($NH_3$), boron trichloride ($BCl_3$) carbon dioxide ($CO_2$), chlorine ($Cl_2$), chlorine trifluoride ($ClF_3$), dichlorosilane ($SiH_2Cl_2$), trichlorosilane ($SiHCl_3$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), tungsten hexafluoride ($WF_6$) and a perfluorocarbon.

29. The method according to claim 24, wherein the point of use comprises a semiconductor processing tool.

30. The method according to claim 24, wherein the purified light vapor fraction is introduced to a plurality of points of use.

31. The method according to claim 24, wherein the column is operated at a pressure of from about 1 to 100 bar, and at a temperature of from about −200 to 300° C.

32. A method for delivery of a vapor phase product to a point of use, the method comprising:
providing a storage vessel containing a liquid chemical under its own vapor pressure;
providing a plurality of columns, each column fractionating a liquid introduced therein into a respective heavy liquid fraction and a respective light vapor fraction, a first column of the plurality of columns being connected to receive, as the liquid introduced therein, the chemical in liquified state from the storage vessel; and
removing from a second column of the plurality of columns the respective light vapor fraction;
introducing the second column light vapor fraction to the point of use.

33. The method according to claim 32, wherein the storage vessel is a bulk transport vessel.

34. The method according to claim 32, further comprising a step of superheating the purified light vapor fraction prior to the introducing to the point of use.

35. The method according to claim 34, further comprising containing the light vapor fraction from the final column in a surge tank prior to the introducing to the point of use.

36. The method according to claim 32, wherein the electronics specialty gas is selected from the group consisting of ammonia ($NH_3$), boron trichloride ($BCl_3$), carbon dioxide ($CO_2$), chlorine ($Cl_2$), chlorine trifluoride ($ClF_3$), dichlorosilane ($SiH_2Cl_2$), trichlorosilane ($SiHCl_3$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), tungsten hexafluoride ($WF_6$) and a perfluorocarbon.

37. The method according to claim 32, wherein the point of use comprises a semiconductor processing tool.

38. The method according to claim 32, wherein the purified light vapor fraction is introduced to a plurality of points of use.

39. The method according to claim 32, wherein the plurality of columns operate at a pressure of from about 1 to 100 bar, and at a temperature of from about −200 to 300° C.

40. A system for delivery of an electronics specialty gas to a semiconductor processing tool, the system comprising:
a storage vessel containing a liquid chemical under its own vapor pressure;
a column connected to receive the chemical in liquified state from the storage vessel, whereby the chemical is fractionated into a contaminated liquid heavy fraction and a purified light vapor fraction; and
a conduit connected to the column for removing the purified light vapor fraction therefrom;
wherein the system is connected to the semiconductor processing tool for introducing the purified light vapor fraction thereto, and the purified light vapor fraction is an electronics specialty gas.

41. A system for delivery of an electronics specialty gas to a semiconductor processing tool, the system comprising:
a storage vessel containing a liquid chemical under its own vapor pressure;
a plurality of columns, each column fractionating a liquid introduced therein into a respective heavy liquid fraction and a respective light vapor fraction;
a first column of the plurality of columns being connected to receive, as the liquid introduced therein, the chemical in liquified state from the storage vessel; and
a conduit connected to a second column of the plurality of columns for removing therefrom the respective light vapor fraction;
wherein the system is connected to a semiconductor processing tool for introducing the second column light vapor fraction thereto, and the purified light vapor fraction is an electronics specialty gas.

42. A method for delivery of an electronics specialty gas to a semiconductor processing tool, the method comprising:
providing a storage vessel containing a liquid chemical under its own vapor pressure;
introducing a stream of the chemical in liquified state into a column, whereby the chemical is fractionated into a contaminated liquid heavy fraction and a purified light vapor fraction; and
introducing the purified light vapor fraction to the semiconductor processing tool, wherein the purified light vapor fraction is an electronics specialty gas.

43. A method for delivery of an electronics specialty gas to a semiconductor processing tool, the method comprising:
providing a storage vessel containing a liquid chemical under its own vapor pressure;
providing a plurality of columns, each column fractionating a liquid introduced therein into a respective heavy liquid fraction and a respective light vapor fraction, a first column of the plurality of columns being connected to receive, as the liquid introduced therein, the chemical in liquified state from the storage vessel; and
removing from a second column of the plurality of columns the respective light vapor fraction;
introducing the purified light vapor fraction to the semiconductor processing tool, wherein the purified light vapor fraction is an electronics specialty gas.

44. An on-site chemical distribution system, comprising:
a storage vessel containing a liquid chemical under its own vapor pressure; and
a plurality of vapor supply systems connected in parallel and downstream from the storage vessel, the vapor supply systems being connected to receive the chemical in liquified state and each producing a respective purified vapor product;
wherein the vapor supply systems are each connected to one or more respective points of use for introducing the respective purified vapor product thereto.

45. The on-site chemical distribution system according to claim 44, wherein each of the vapor supply systems comprises one or more columns.

46. The on-site chemical distribution system according to claim 45, wherein the one or more columns contain an adsorbent, a packing material, trays or a combination thereof.

47. The on-site chemical distribution system according to claim 45, wherein each of the vapor supply systems further comprises a superheater for superheating the purified light vapor fraction.

48. The on-site chemical distribution system according to claim 44, wherein the one or more points of use comprise one or more semiconductor processing tools.

49. The on-site chemical distribution system according to claim 44, further comprising a reservoir for containing the liquid chemical, the reservoir being disposed downstream of the storage vessel and upstream of the vapor supply systems.

50. The on-site chemical distribution system according to claim 49, further comprising a recycle line connected to the reservoir for recycling thereto that portion of the liquid chemical which is not fed to the plurality of vapor supply systems.

51. A method for on-site distribution of a chemical, the method comprising:

provided a storage vessel containing a liquid chemical under its own vapor pressure;

introducing the chemical in liquified form to a plurality of vapor supply systems connected in parallel and downstream from the storage vessel, each of the vapor supply systems producing a respective purified vapor product; and introducing the respective purified vapor product to one or more respective points of use.

52. The method according to claim 51, wherein each of the vapor supply systems comprises one or more columns.

53. The method according to claim 52, wherein the one or more columns contain an adsorbent, a packing material, trays or a combination thereof.

54. The method according to claim 51, further comprising superheating the purified vapor products prior to introduction to the one or more points of use.

55. The method according to claim 51, wherein the one or more points of use comprise one or more semiconductor processing tools.

56. The method according to claim 51, further comprising recycling to a reservoir that portion of the liquid chemical which is not fed to the plurality of vapor supply systems.

57. The method according to claim 51, wherein the high purity vapor phase product is an electronics specialty gas.

58. The system according to claim 57, wherein the electronics specialty gas is selected from the group consisting of ammonia ($NH_3$), boron trichloride ($BCl_3$), carbon dioxide ($CO_2$), chlorine ($Cl_2$), chlorine trifluoride ($ClF_3$), dichlorosilane ($SiH_2Cl_2$), trichlorosilane ($SiHCl_3$), disilane ($Si_2H_6$), hydrogen bromide (HBr), hydrogen chloride (HCl), hydrogen fluoride (HF), nitrous oxide ($N_2O$), perfluoropropane ($C_3F_8$), sulfur hexafluoride ($SF_6$), tungsten hexafluoride ($WF_6$) and a perfluorocarbon.

* * * * *